(12) United States Patent
Davies et al.

(10) Patent No.: US 9,032,835 B2
(45) Date of Patent: May 19, 2015

(54) STEERING COLUMN ASSEMBLY

(75) Inventors: Niclas Davies, Birmingham (GB);
Sathish Babu Muthukalyani, Solihull (GB); Slawomir Kwasny, Czechowice-Dziedzice (PL)

(73) Assignees: TRW Steering Systems Poland S.P. Z.O.O., Czechowice-Dziedzice (PL); TRW Limited, West Midlands (GB)

( * ) Notice: Subject to any disclaimer, the term of this patent is extended or adjusted under 35 U.S.C. 154(b) by 0 days.

(21) Appl. No.: 13/877,941

(22) PCT Filed: Oct. 7, 2011

(86) PCT No.: PCT/GB2011/051927
§ 371 (c)(1),
(2), (4) Date: Aug. 22, 2013

(87) PCT Pub. No.: WO2012/046075
PCT Pub. Date: Apr. 12, 2012

(65) Prior Publication Data
US 2013/0319163 A1 Dec. 5, 2013

(30) Foreign Application Priority Data

Oct. 8, 2010 (EP) ..................... 10187054

(51) Int. Cl.
*B62D 1/184* (2006.01)
*B62D 1/18* (2006.01)
*B62D 1/187* (2006.01)

(52) U.S. Cl.
CPC . *B62D 1/18* (2013.01); *B62D 1/187* (2013.01); *B62D 1/184* (2013.01)

(58) Field of Classification Search
CPC ................................. B62D 1/184; B62D 1/187
USPC ........................................................ 74/493
See application file for complete search history.

(56) References Cited

U.S. PATENT DOCUMENTS 8,151,667 B2 * 4/2012 Appleyard et al. .............. 74/493
8,590,932 B2 * 11/2013 Dietz et al. ..................... 280/775
(Continued)

FOREIGN PATENT DOCUMENTS

DE 102006034714 A1 1/2008
GB 2463595 B * 12/2011
(Continued)

OTHER PUBLICATIONS

International Search Report for International Application No. PCT/GB2011/051927 dated Jan. 20, 2012.

*Primary Examiner* — Karen Beck
(74) *Attorney, Agent, or Firm* — MacMillan, Sobanski & Todd, LLC

(57) ABSTRACT

A steering column assembly comprises a steering column shroud comprising an inner and an outer tubular member, a support bracket which is fixed to part of the vehicle, and a clamp assembly which includes a cab mechanism having a fixed portion and a moving portion and a clamp pin which passes through arms of the support bracket, the clamp pin being provided with a first reaction member located towards one end of the pin outside of one arm of the support bracket and a second reaction member located towards the other end of the clamp pin outside of the other arm of the support bracket such that the arms of the bracket are located on the clamp pin between the reaction members and with the cam assembly located between the outside of one arm and one of the reaction members. The fixed cam portion is mechanically connected to the support bracket such that at least during an initial release phase of the clamp assembly the force required to produce a rotational movement of the fixed cam portion relative to the support bracket exceeds any rotational force exerted on the fixed part due to strain energy stored in the assembly.

14 Claims, 3 Drawing Sheets

(56) References Cited

U.S. PATENT DOCUMENTS

| | | | |
|---|---|---|---|
| 2005/0016315 A1* | 1/2005 | Breuss et al. | 74/493 |
| 2006/0219499 A1* | 10/2006 | Organek | 188/164 |
| 2006/0237959 A1* | 10/2006 | Dimig et al. | 280/776 |
| 2007/0204714 A1* | 9/2007 | Lutz | 74/493 |
| 2009/0301254 A1* | 12/2009 | Appleyard et al. | 74/493 |
| 2010/0139438 A1* | 6/2010 | Appleyard et al. | 74/493 |
| 2013/0319163 A1* | 12/2013 | Davies et al. | 74/493 |

FOREIGN PATENT DOCUMENTS

| | | |
|---|---|---|
| JP | 2003112633 A | 4/2003 |
| WO | 2007026114 A1 | 3/2007 |
| WO | WO 2007026114 A1 * | 3/2007 |

* cited by examiner

STEERING COLUMN ASSEMBLY

CROSS-REFERENCE TO RELATED APPLICATIONS

This application is a national stage of International Application No. PCT/GB2011/051927 filed Oct. 7, 2011, the disclosures of which are incorporated herein by reference in entirety, and which claimed priority to European Patent Application No. EP 10187054.1 filed Oct. 8, 2010, the disclosures of which are incorporated herein by reference in entirety.

BACKGROUND OF THE INVENTION

This invention relates to improvements in steering column assemblies.

Steering column assemblies for automotive vehicles and the like are increasingly required to be adjustable for rake and, in many cases, reach. This requires the column shroud, within which the steering column is rotatably located, to be fixed to the vehicle by a clamp mechanism which can be locked and unlocked to either prevent movement or permit adjustment of the column shroud position respectively.

One common arrangement uses a column shroud which comprises an inner tubular member and an outer tubular member which telescope one inside the other to permit reach adjustment. A fixing rail welded to one of the tubes is secured to a support bracket by a releasable clamp mechanism. A simple single adjust mechanism includes a generally vertical elongate slot in the support bracket. The clamp mechanism can then move along the slot when in the unlocked position to provide rake adjustment. Reach adjustment can be achieved by providing an elongate slot in the guide rail generally parallel to the axis of the column through which the clamp mechanism passes.

Other mechanisms have been proposed for clamping the tubes to the support bracket.

In one proposed arrangement, the support bracket is generally U-shaped and has two depending arms which embrace the clamp rails, the clamp mechanism passing through respective slots in each arm. One of the arms, or perhaps both, comprise an outer leaf which extends downwards from the base of the U-shaped bracket, and an inner leaf which extends upwards from the free end of the outer leaf towards the base. The clamp mechanism passes cleanly through an opening in the outer leaf and acts upon the inner leaf to clamp the inner leaves, and hence the clamp rails, together. An arrangement of this kind is known from WO 2007/026114A1, the disclosure of which is incorporated herein by reference in entirety.

BRIEF SUMMARY OF THE INVENTION

According to a first aspect there is provided a steering column assembly comprising a steering column shroud which supports a steering shaft for a steering wheel, the column shroud comprising an inner tubular member and an outer tubular member, the inner tubular member being at least partially received within the outer tubular member, a support bracket which is fixed in position relative to a part of the vehicle, the outer tubular member passing between two spaced apart arms of the bracket, and a clamp assembly which includes a cam mechanism, and in which the clamp assembly includes a clamp pin which passes through openings in each of the two arms of the bracket, the clamp pin being provided with a first reaction member located towards one end of the pin outside of one arm of the support bracket and a second reaction member located towards the other end of the clamp pin outside of the other arm of the support bracket such that the arms of the bracket are located on the clamp pin between the reaction members and with the cam assembly located between the outside of one arm and one of the reaction members, in which the clamp mechanism comprises a fixed cam portion and a moving cam portion, the mechanism being movable between a locked position in which the overall length of the cam mechanism is such that the arms of the support bracket are squeezed together causing an elongate slot in the outer tubular member to at least partially close up and thereby causing the outer tube to clamp onto the inner tubular member, and an unlocked position in which the overall length of the cam mechanism is shorter so that the arms of the clamp bracket are free to move apart, allowing the elongate slot to open and thereby releasing the grip of the outer tubular member on the inner tubular member, characterised in that the fixed cam portion is mechanically connected to the support bracket such that at least during an initial release phase of the clamp assembly (as it moves from the locked to unlocked conditions) the force required to produce a rotational movement of the fixed cam portion relative to the support bracket exceeds any rotational force exerted on the fixed part due to strain energy stored in the assembly that would otherwise tend to attempt to cause the fixed cam portion to rotate.

The applicant has found that, in some cases, a severe and rapid rotation of the fixed cam portion on releasing the clamp can occur as the strain force stored in the assembly, perhaps in the spring, or outer tube or even the clamp pin, is released. This can cause the fixed cam portion to rotate around the axis of the clamp pin and to knock against a part of the clamp bracket causing an undesirable audible clicking noise. This can occur, for example, where the support bracket has an arm with an outer leaf and an inner leaf with the cam portion passing through the outer leaf with a clearance fit so that it only acts upon the inner leaf. The cam when it rotates may strike the side of the opening in the outer leaf which can cause a loud click noise or even damage the outer leaf. The assembly of the present invention ameliorates and in some cases may completely eliminate this problem.

The cam mechanism may comprise a high lift cam. The skilled person will understand that this means that the length of the cam changes a relatively large amount for a given rotation of the moving cam, and requires relatively steep ramp angles on the cam lift faces. These steep ramp angles are thought to contribute to the high stored strain in the clamped condition, which could cause the clicking noise but can be overcome by the present invention.

The mechanical connection between the fixed cam portion and the support bracket may be so arranged as to be sufficient to resist rotational movement of the fixed cam portion until the clamp assembly is at least 50 percent released, or at least 75 percent released, by which time at least some of the strain energy will have been released and any rotation that may then occur will be considerably less forceful. Looked at another way, the mechanical connection between the fixed cam portion and the support bracket may be such that rotation of the fixed cam portion is resisted until at least 25 percent, or at least 50 percent, or at least 90 percent of the strain energy stored in the clamp assembly is released. In a typical assembly the clamp bolt tension when fully clamped may be between 2500 and 3000 N, and the invention may therefore delay the rotation until the clamp bolt tension has fallen to less than 1500N or less than 1000 N.

By fixed cam portion we mean a part of the cam mechanism which does not rotate relative to the clamp pin, and by moving cam portion we mean a part which does rotate. Both parts may be free to move axially along the clamp pin, although it will be apparent that in use this movement is restrained by the presence of other parts of the assembly. A handle or lever may be provided which enables a driver to rotate the moving cam portion, to clamp and unclamp the clamp assembly. If preferred, this could be replaced by an actuator such as an electric motor.

The inner and outer members are preferably tubular, and most preferably tubular cylindrical The support bracket may therefore be U shaped, perhaps an inverted U-shape, having a base from which the arms depend. One or more upstanding portions may be provided for attaching the bracket to a fixed part of the vehicle chassis. At least one vertical arm may have an inner and an outer leaf with fixed cam part being mechanically connected to the inner leaf only when the clamp assembly is locked.

The fixed cam portion may pass through an elongate slot in the support bracket allowing the fixed cam portion and clamp pin to move relative to the support bracket to provide adjustment for rake of the steering assembly.

The mechanical connection between the fixed cam portion and the support bracket when the clamp assembly is locked may comprise a direct contact between a part of the fixed cam portion and a part of the support bracket. It may be a direct face to face contact which provides a friction force between the faces that resists rotation.

The fixed cam portion may have a face which engages a face of the arm of the support bracket, perhaps a face of the inner leaf of a support bracket, one or both of the contact faces having a high surface roughness.

The materials used to form the faces that contact may be of such hardness that on clamping the faces together the rough face bites into the other face, providing a temporary mechanical connection with a high frictional force between the faces to prevent rotation due to stored strain energy.

The friction force will depend on the force applied to the fixed cam axially along the clamp pin multiplied by the coefficient of friction of the faces. If the faces bite together the force will be increased as the faces are no longer purely parallel to one another at all points. This force will vary as the clamp is released, and also will increase as the roughness of the faces increases and according to how well they "bite" into one another. Similarly the strain force will also vary between the clamped and unclamped positions, and the invention provides a mechanical connection whereby the friction force exceeds the rotational strain force at least until the strain force is reduced to an acceptable level during unclamping.

The rough face may have a waffle texture comprising a series of criss crossing small ridges which protrude above the rest of the surface to define with troughs formed therebetween. This will increase the surface area of the contact face whilst also the ridges will provide bite, giving high friction. It may have other textures, for example comprising a plurality of small spaced teeth or barbs, or radially extending ridges formed on the surface.

Preferably the cam portion surface that engages the bracket is roughened and the face of the arm of the support bracket is relatively smoother. Alternatively, the support bracket may be roughened and the face of the cam portion smoother or both may be roughened.

Where the arm of the bracket comprises and inner leaf and an outer leaf, with the fixed cam passing through an opening in the outer leaf to engage the inner leaf a liner of soft material, such as plastic, may be provided within the slot in the outer leaf of the arm of the support bracket, to further reduce any noise due to movement, such as may occur towards the end of the release of the clamp assembly, if rotation of the fixed cam portion occurs towards the end of the release of the cam assembly. At this point, much of the strain energy will have been dissipated, so the rotation will be relatively slow and the liner will absorb the energy.

The fixed cam portion may be a clearance fit within the liner so that the liner prevent large rotational movement of the fixed cam portion relative to the support arm. Of course, during clamping the cam will rotate slightly within this slot to engage the liner, and this rotation is in the opposite direction to that which the strain force released as the clamp is initially unclamped will tend to want to cause the cam to rotate.

A spring may be located between the arms of the support bracket to push them apart when released. The spring may act upon each arm through a respective spacer. The spacer may also act upon the fixed cam portion to hold the fixed cam portion clear of the arm of the support bracket when the assembly is in the unclamped position.

To enable to the cam portion to be held clear, it may be provided with one or more protrusions that pass through the slot in the arm of the support bracket which engages the spacer. Alternatively, the spacer may be provided with one or more lugs which pass through the slot to engage the fixed cam portion.

The lugs should be slightly longer than the thickness of the inner leaf of the bracket arm.

Of course, a lug could be provided on the cam portion and also the spacer, the two lugs engaging one another midway (or at same other point) through the inner leaf.

It has been appreciated that the rough face to face contact between the fixed cam portion and the support bracket arm would cause undue wear, and may make adjustment difficult as the friction has to be overcome. The use of the lugs to hold the faces clear of one another in the unclamped position overcomes this potential issue.

The moving cam portion, fixed cam portion, spacers (where present), spring and arms of the support bracket may all be threaded onto a common clamp pin or bolt in the following preferred order: Moving cam portion, fixed cam portion, first arm of support bracket, spacer, spring, spacer, and second arm of support bracket. At each end of the pin or bolt a reaction member may be provided which cannot move axially along the pin or bolt.

The outer tube member may include two clamp rails, each welded on one side of the slot in the outer tube so the rails face each other across the slot, each rail including an opening through which the clamp assembly is passed. The openings may comprise elongate slots which permit movement of the outer member relative to the clamp assembly thereby providing reach adjustment of the steering column assembly.

The fixed cam portion and moving cam portions may each carry a ramp which slides over a ramp on the other portion to form a cam mechanism, causing the cam mechanism to change length as the moving portion is rotated about the axis of the pin relative to the fixed portion.

Other advantages of this invention will become apparent to those skilled in the art from the following detailed description of the preferred embodiments, when read in light of the accompanying drawings.

DETAILED DESCRIPTION OF THE INVENTION

Figure 1:
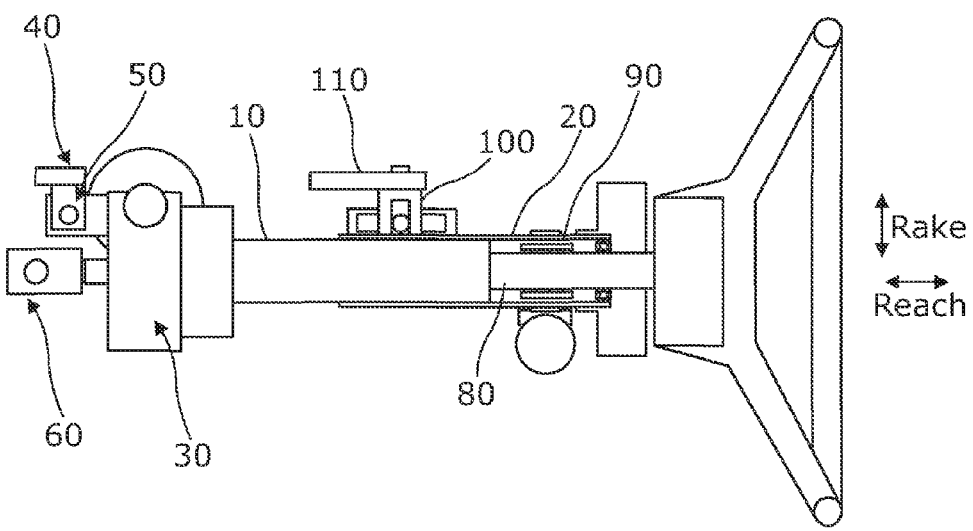
FIG. 1 show a first embodiment of a steering column assembly in accordance with the present invention.

As shown in FIG. 1, a steering column assembly comprises a sleeve or shroud that comprises an inner member 10 and an outer member 20 which receives a portion of the inner member 10. The inner and outer members 10, 20 are of metal and tubular cylindrical with the inside diameter of the outer member 20 being only slightly greater than the outside diameter of the inner member 10 so as to permit relative movement between them by sliding. In the example, the inner member is secured to an electric power steering actuator 30 which is secured to the vehicle body 40 at a pivot point 50 and in turn connects to a rack and pinion through an intermediate coupling 60. The outer member 20 extends away from that towards a steering wheel 70 as is known in the art. The steering wheel 70 is supported by a telescopic steering shaft (shown as 80 in FIG. 1) that is free to rotate within the steering column shroud 20, 10. It is located within the shroud by bearing 90. In other arrangements the outer shroud member may connect to the gearbox housing and the inner extend away from that.

The steering column shroud 10, 20 is fixed to a support bracket 100 secured to a further part 110 of the body of the vehicle by a clamp assembly. The bracket 100 is typically welded or bolted in place in a region under the dashboard and is positioned along the shroud at a point somewhere between the pivot and the steering wheel. The clamp assembly can be moved between a locked (clamped) position and an unlocked (unclamped) position to allow the rake of the steering column to be adjusted by pivoting about the pivot. When locked the steering column cannot be moved other than in an accident.

Figure 2:
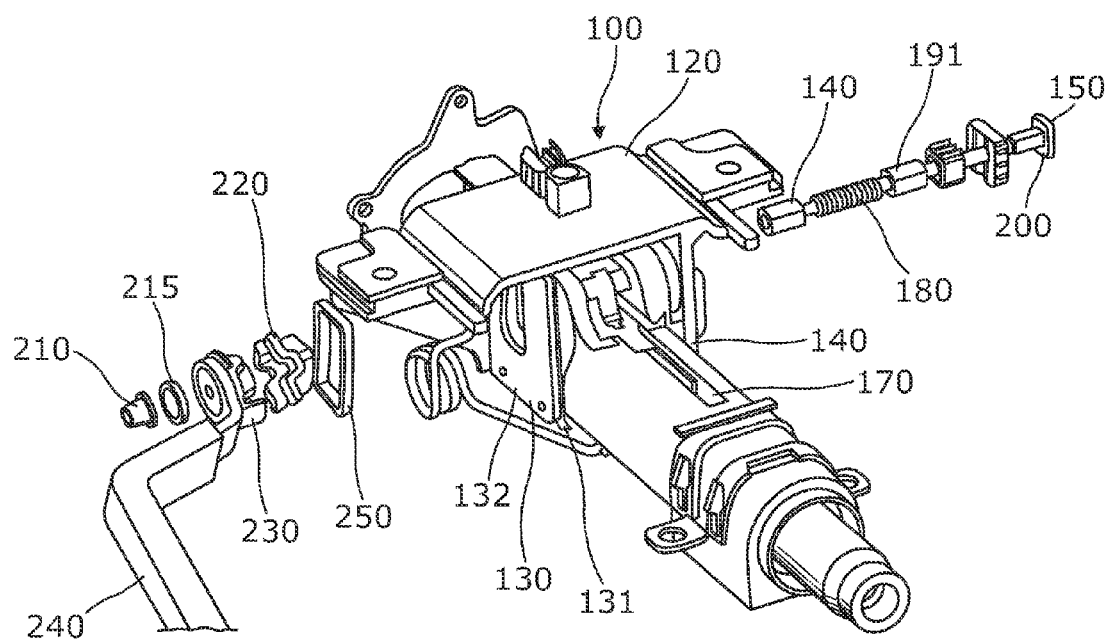
FIG. 2 shows in exploded view the component parts of the embodiment of FIG. 1.
Figure 3:
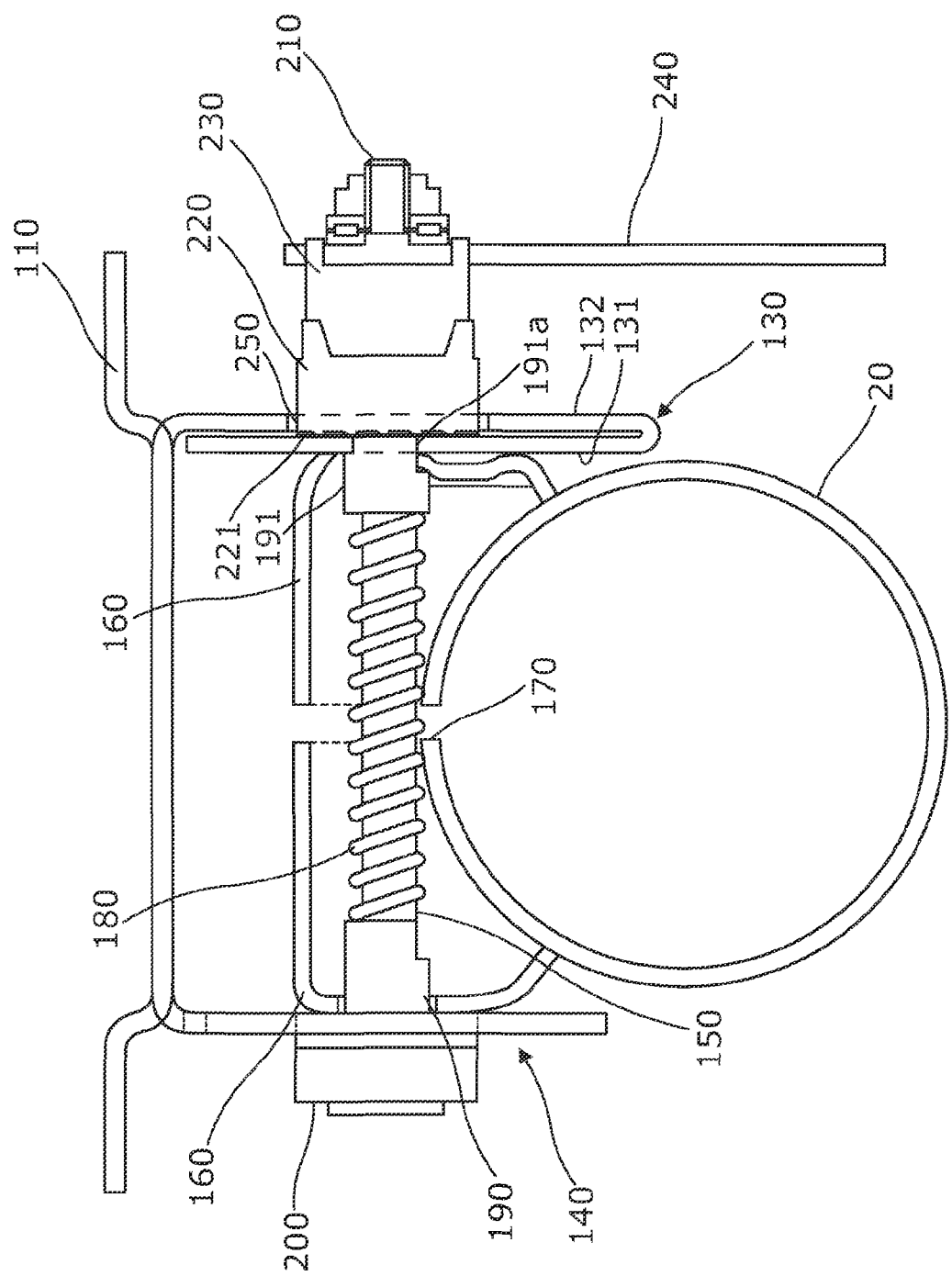
FIG. 3 is a view in cross section of the embodiment of FIG. 1 showing clearly the face of the fixed cam portion that faces a corresponding face of the inner leaf of the support bracket.

The bracket 100 and the clamp assembly can better be seen in FIGS. 2 and 3 of the accompanying drawings. The bracket 100 comprises a metal component of an inverted U shape having a base 120 and two depending arms 130, 140 which extend vertically downwards from either side of the base 120. The outer tube 20 passes between the arms 130, 140 in the region where it telescopically overlaps the inner shroud portion 100. One of the arms comprises an inner leaf 131 and an outer leaf 132, both of which have aligned elongate openings through which a clamp pin 150 passes. The slot in the outer leaf is typically wider than that in the inner leaf so the ides of the slot in the outer leaf can be used as a location to prevent the fixed cam 200 from rotating while at the same time the inner end face of the fixed cam can bear against the inner leaf when the clamping device is locked. The pin 150 passes through openings in a pair of opposing guide or clamp rails 160 fixed to the top of the outer tube 20 by welding and which are located on opposing sides of an elongate slot 170 in the outer tube 20. The slots in the arms extend generally vertically and allow the position of the shroud 10, 20 to be adjusted for rake by permitting the clamp pin 150 to move up and down within the slots in the arms. The openings in the guide rails may also be elongate and extend along the axis of the outer shroud 10, 20 allowing the outer shroud to move relative to the pin 150. This movement provides some reach adjustment for the steering column assembly.

The pin 150 is part of a clamp assembly which acts to squeeze together the arms 130, 140 of the support bracket which in turn squeezes together the guide rails 160. This action closes up the elongate slot 170 in the outer tube 20, reducing the internal diameter of the outer tube so that it grips the inner tube 10. A coil spring 180 is located on the centre of the clamp pin 150 and abuts at each one end of each of spacers 190, 191. The other end of spacer 190 presses onto the inside of arm 140 of the support bracket. The other end of spacer 191 presses onto the inside of the fixed cam 220. When the clamp assembly is in the released position this spring 180 pushes the arms apart to open up the elongate slot 170 in the outer tube 20.

Figure 4:
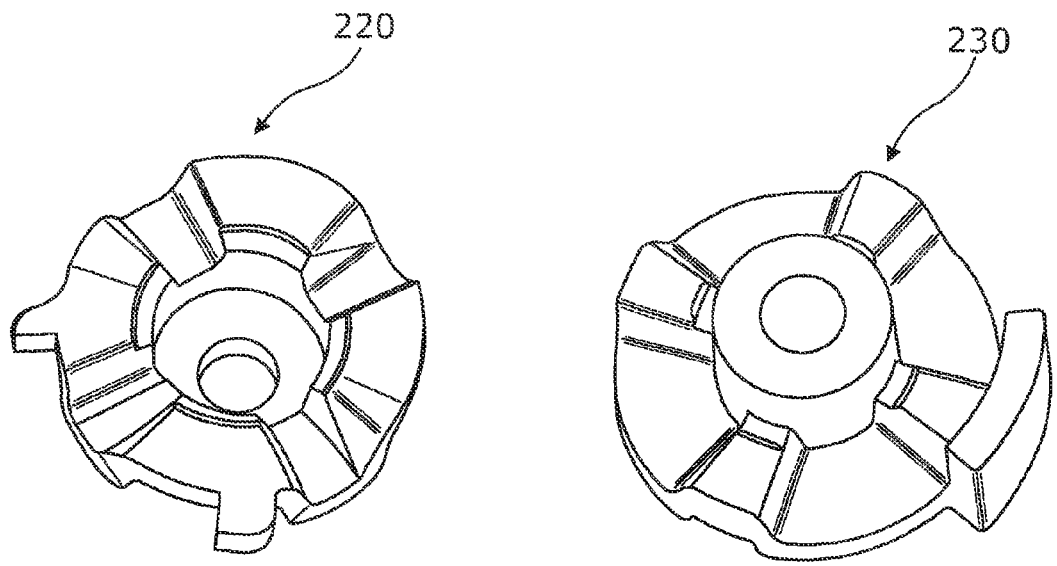
FIG. 4 is a view of the ramps of the two cam portions.

To squeeze the arms together each end of the pin 150 is provided with a fixed reaction member 200, 210, whilst a cam mechanism is provided between one of the reaction members 210 and the adjacent arm of the support bracket. The cam locking mechanism includes a fixed cam portion 220 and moving cam portion 230. These can best be seen in FIG. 4 of the accompanying drawings in which the cams of the two cams are clearly shown. Rotating the moving cam portion 230 causes the ramp on the moving portion 230 to ride over a ramp on the fixed portion 220, which changes the overall length of the cam. Generally in the unclamped position of the cam mechanism the overall length of the cam mechanism is less than when it is in the clamped position. This increase in length causes a force to be exerted between the reaction means 110, 120 as the pin 70 is placed in tension and this causes the arms 140, 131 of the bracket 110 to be squeezed together to clamp onto the guide rail 160 attached to the outer member 20.

In more detail, the clamp pin 150 is provided with components in the following order starting at one end: reaction member 210, optional thrust bearing 215, cam mechanism comprising moving portion 230 and fixed cam portion 220; inner and outer leaves of one bracket arm 130, the other bracket arm 140, and reaction block 200. A handle or lever 240 is attached to the moving cam portion 230 to enable it to be rotated around the clamp pin 150 by a driver.

Figures 5, 6:
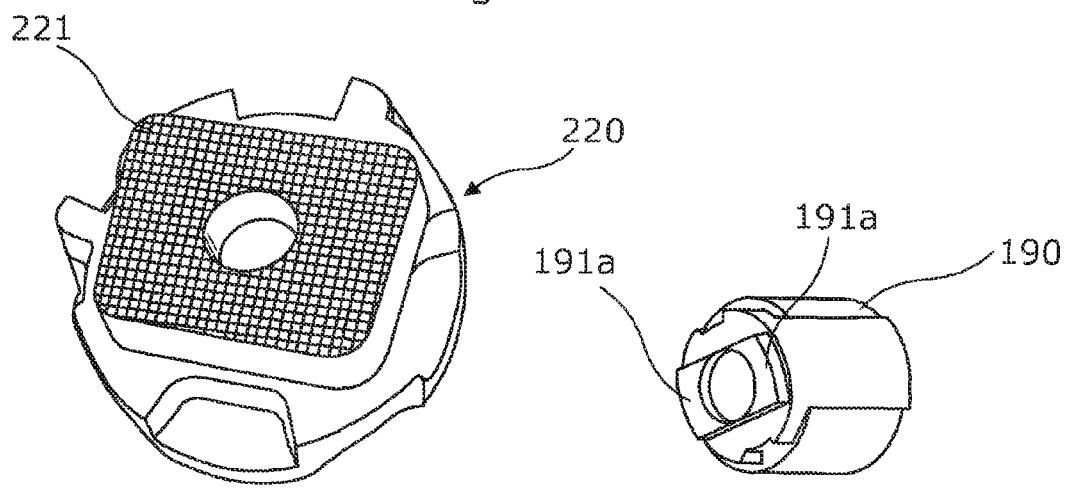
FIG. 5 illustrates the roughened waffle surface of the face of the fixed cam portion.
FIG. 6 illustrates the location of two small lugs provided on an adjacent spacer to hold the rough face clear of the inner leaf when in the unclamped position.

The fixed cam portion 220 passes cleanly through an oversized slot in the outer leaf of the adjacent arm 130 of the support bracket and a face of the fixed cam portion opposes a face of the inner leaf 131 of that arm adjacent the slot in the inner leaf, which is not oversized. As shown in FIG. 6 the spacer 190 includes two small lugs which pass through the opening in the inner leaf to engage the fixed cam. These lugs hold the face of the fixed cam portion clear of the face of the inner leaf when the clamp assembly is unclamped. On clamping the fixed cam presses against the spacer compressing the spring until the face of the fixed cam engages the face of the inner leaf, and thereafter the fixed cam portion 220 presses against the inner leaf 131.

Figure 7:
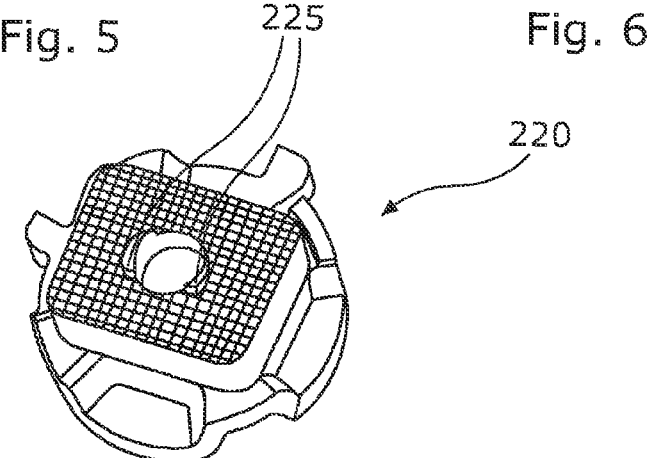
FIG. 7 is a view of an alternative arrangement in which the lugs are provided on the fixed cam portion.

In an alternative shown in FIG. 7 the fixed cam 220 includes two small lugs 225. These can be seen in FIG. 4 of the drawings, the lugs are small enough to pass through the slot in the inner leaf to engage an adjacent spacer, and the lugs are just slightly longer than the thickness of the inner leaf. In an alternative, shown in FIG. 5, the lugs are provided on the spacer and pass through the slot in the inner leaf to engage the face of the fixed cam portion.

When clamped, the fixed cam portion 220 initially moves to press on the spacer, compressing the spring, until the face of the fixed cam portion engages the face of the inner leaf. Continued rotation then compresses the spring further and presses the inner leaves of the support bracket arms together.

The applicant has appreciated that during this compression, when moving from unclamped to clamped, a considerable amount of strain energy may be generated in parts of the assembly, especially the spring and spacers, and perhaps also the pin. Unless care is taken, when releasing the clamp assembly the strain energy may cause a violent rotation of the fixed cam portion within the slot in the outer leaf of the arm of the support bracket. This can produce a clicking noise and may even damage the bracket or cam portion.

To prevent this, the surface 221 of the fixed cam portion which engages the inner leaf is roughened. As shown in FIG. 5 this can be achieved by providing a waffle texture to the surface to form criss crossing ridges. When the assembly is clamped these bite into the surface of the inner leaf. This provides a direct mechanical connection between the fixed cam portion and the support bracket that resists attempts to rotate the cam portion during initial release. Only when the face of the cam portion is finally pushed clear of the inner leaf by the lugs will it be free to rotate, and by then most if not all of the unwanted strain will have been released from the assembly.

In the event that some rotation does occur, perhaps at a low rate towards the end of the release of the clamp assembly, a liner 250 of soft plastic or rubber material is provided on the inner edge of the slot in the outer leaf. The fixed cam portion will strike this soft material and so any noise that will be produced will be greatly reduced. The fixed cam portion is a clearance fit within this liner, and the liner provides the function of preventing rotation of the fixed cam as the clamp mechanism is moved to the clamped position.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising a steering column shroud which supports a steering shaft for a steering wheel, the column shroud comprising an inner tubular member and an outer tubular member, the inner tubular member being at least partially received within the outer tubular member, a support bracket which is fixed in position relative to a part of the vehicle, the outer tubular member passing between two spaced apart arms of the bracket, and a clamp assembly which includes a cam mechanism, and in which the clamp assembly includes a clamp pin which passes through openings in each of the two arms of the bracket, the clamp pin being provided with a first reaction member located towards one end of the clamp pin outside of one arm of the support bracket and a second reaction member located towards the other end of the clamp pin outside of the other arm of the support bracket such that the arms of the support bracket are located on the clamp pin between the reaction members and with the cam assembly located between the outside of one arm and one of the reaction members, in which the clamp mechanism comprises a fixed cam portion and a moving cam portion, the clamp mechanism being movable between a locked position in which the overall length of the cam mechanism is such that the arms of the support bracket are squeezed together causing an elongate slot in the outer tubular member to at least partially close up and thereby causing the outer tube to clamp onto the inner tubular member, and an unlocked position in which the overall length of the cam mechanism is shorter so that the arms of the clamp bracket are free to move apart, allowing the elongate slot to open and thereby releasing the grip of the outer tubular member on the inner tubular member, wherein the fixed cam portion is mechanically connected to the support bracket such that at least during an initial release phase of the clamp assembly the force required to produce a rotational movement of the fixed cam portion relative to the support bracket exceeds any rotational force exerted on the fixed part due to strain energy stored in the assembly that would otherwise cause the fixed cam portion to rotate, and in which the support bracket has an inverted U-shape, having a base from which vertical arms depend with at least one vertical arm may have an inner and an outer leaf, the fixed cam part being mechanically connected to the inner leaf when the clamp assembly is locked and in which the fixed cam portion passes through an elongate slot in the support bracket allowing the fixed cam portion and clamp pin to move relative to the support bracket to provide adjustment for rake of the steering assembly.

2. A steering column assembly according to claim 1 in which the cam assembly comprises a high lift cam.

3. A steering column assembly according to claim 1 in which the mechanical connection between the fixed cam portion and the support bracket arranged such that rotation of the fixed cam portion is resisted until at least 25 percent of the tension in the clamp bracket when fully clamped is released.

4. A steering column assembly according to claim 1 in which the mechanical connection between the fixed cam portion and the support bracket arranged such that rotation of the fixed cam portion is resisted until at least 50 percent of the tension in the clamp bracket when fully clamped is released.

5. A steering column assembly according to claim 1 in which the mechanical connection between the fixed cam portion and the support bracket when the clamp assembly is locked comprises a direct contact between a part of the fixed cam portion and a part of the support bracket.

6. A steering column assembly according to claim 5 in which the direct contact comprises a direct face to face contact which provides a friction force between the faces that resists rotation.

7. A steering column assembly according to claim 6 in which one or both of the contact faces have a high surface roughness.

8. A steering column assembly according to claim 7 in which the materials used to form the faces that contact are of such hardness that on clamping the faces together the rough face bites into the other face, providing a temporary mechanical connection with a high frictional force between the faces to prevent rotation due to stored strain energy.

9. A steering column assembly according to claim 7 in which the rough face has a waffle texture comprising a series of crisscrossing small ridges which protrude above the rest of the surface to define with troughs formed therebetween.

10. A steering column assembly according to claim 7 in which the cam portion surface that engages the bracket is roughened and the face of the arm of the support bracket is relatively smoother.

11. A steering column assembly according to claim 1 in which a liner of soft material is provided within the slot in the outer leaf of the arm of the support bracket, to further reduce any noise due to movement, such as may occur towards the end of the release of the clamp assembly, if rotation of the fixed cam portion occurs towards the end of the release of the cam assembly.

12. A steering assembly according to claim 11 in which the fixed cam portion is a clearance fit within the liner so that the liner prevents large rotational movement of the fixed cam portion relative to the support arm.

13. A steering assembly according to claim 11 in which a spring is located between the arms of the support bracket to push them apart when released, in which the spring acts upon each arm through a respective spacer, and one of the spacers also acts upon the fixed cam portion to hold the fixed cam portion clear of the arm of the support bracket when the assembly is in the unclamped position.

14. A steering assembly according to claim 13 in which the fixed cam portion is provided with one or more protrusions that pass through the slot in the arm of the support bracket which engages the spacer, or in which the spacer is provided with one or more lugs which pass through the slot to engage the fixed cam portion.

* * * * *